Nov. 19, 1935.   M. COLLETTE   2,021,542
ELASTIC DISPLACEABLE LINK FOR USE IN AN ENDLESS CHAIN FOR CARRYING GOODS
Filed Sept. 24, 1934
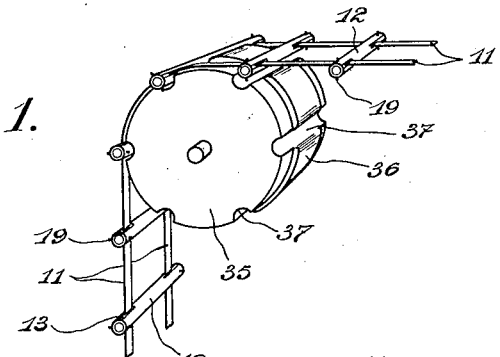
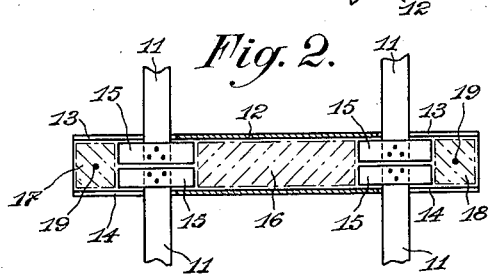
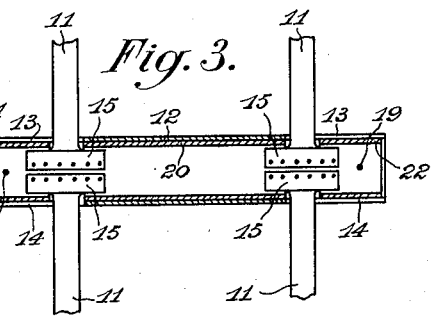
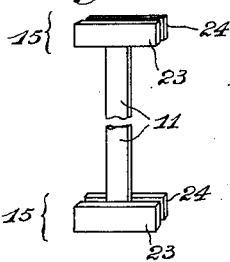
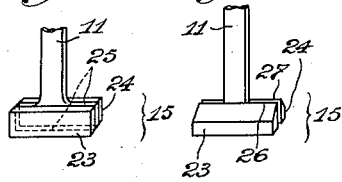
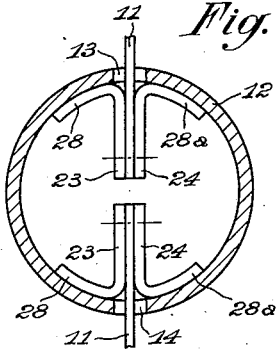
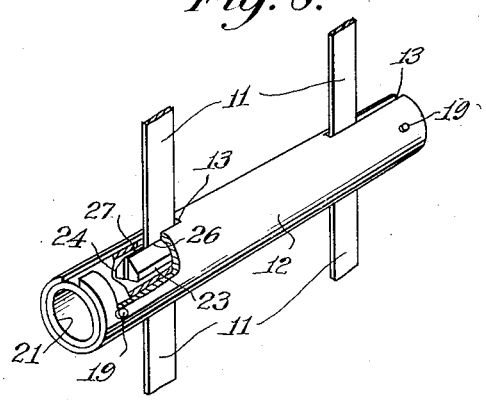
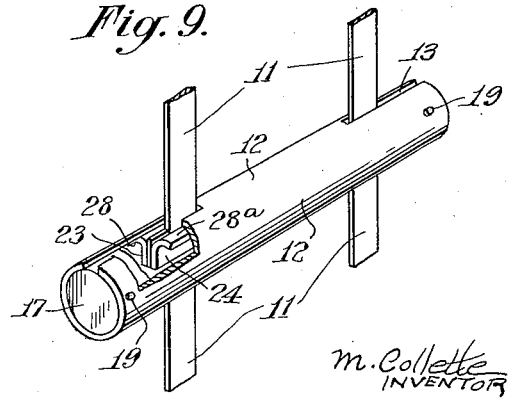
M. Collette
INVENTOR
By: Glascock Downing & Seebress Attys.

Patented Nov. 19, 1935

2,021,542

UNITED STATES PATENT OFFICE 2,021,542

ELASTIC DISPLACEABLE LINK FOR USE IN AN ENDLESS CHAIN FOR CARRYING GOODS

Maurice Collette, Brussels, Belgium

Application September 24, 1934, Serial No. 745,359

7 Claims. (Cl. 198—175)

My invention relates to elastic displaceable links for use in an endless chain formed as above described for carrying goods by means of supports fixed to the chain or alternatively by engaging the goods and allowing them to slide over suitable guides.

According to my invention, the longitudinal element of the elastic displaceable link, comprises one or more flexible bands, whilst the transverse engaging element comprises a cylindrical or tubular body, provided with longitudinal openings or slots diametrically opposite one another, into which adjacent ends of the bands of two adjacent links are introduced, the said ends being provided with shoulder pieces of a suitable form adapted to locate and hold them within the cylindrical body, means being provided to prevent longitudinal displacement of the bands in the openings.

The flexible bands, according to my invention, are intended to surround pulleys or the like for driving the chain, and they may advantageously be made of sheet steel. The ends of the bands are preferably capable of a small angular displacement in the diametrically opposite openings in the tube, about its axis, so as to remove excessive bending in these ends of the steel bands, which are rigidly attached to shoulder pieces capable of angular movement within the tube.

Several embodiments of my invention are illustrated in the accompanying drawing, in which:—

Figure 1 shows in perspective a series of links forming a chain in accordance with the invention, passing over a pulley.

Figure 2 is a transverse section through one of the links of the chain, according to one embodiment of the invention.

Figure 3 is a similar view to Figure 2, showing a second form of link.

Figures 4, 5, 6 and 7 show in perspective and in section various forms of retaining shoulders, which may be fixed to the ends of the flexible bands.

Fig. 8 shows the bevel shoulders with the sleeves of Fig. 3.

Fig. 9 shows the rounded leaf shoulders with the cylinders shown in Fig. 2.

As shown more especially in Figure 1, the chain according to a preferred embodiment of the invention, comprises a series of links made up of two bands or sheets of a flexible metal 11, for example stainless steel, held rigidly together by transverse elements 12.

According to Figures 2, 3 and 7, each of the transverse elements is a tube, in which are diametrically opposite slots 13 and 14. Into these slots, the ends of the flexible bands 11 are introduced and then retained within the tube by means of shoulders such as 15, riveted or welded to them.

Referring to Figure 7, it will be seen that the slots 13 and 14 have a certain width, so that when the chain passes over an operating pulley 35 (Figure 1) the ends of the bands 11 are able slightly to move angularly with reference to the axis of the tubes 12, and so remove excessive bending at these ends, the shoulder pieces being able to slide angularly or to oscillate according to their shape, within the tubes.

As illustrated in Figure 2, the shoulders 15 are maintained in position and held square within the tubes and parallel to its axis, by means of a cylinder 16 and two stoppers 17 and 18, preferably made of wood, these latter being held in the tube by pins, bolts or the like 19.

In Figure 3, the flexible bands are retained in position by an inner sleeve 20 fitted within the tube and by two outer sleeves 21 and 22 fixed by members 19 as in Figure 2; in this case the sleeves withstand radial forces from the shoulder pieces when the bands are under tension.

As shown in detail in Figures 4, 5 and 6, the shoulders 15 provided at either end of the flexible bands 11 may consist of plates 23, 24 forming a T with these bands. These plates may be riveted to the ends of the bands or may be integral with them; alternatively these plates may be attached by welding or other means either to the band itself or to projections of the latter, (Figure 5).

The edges of the shoulder pieces 15 which are in contact with the tubes when the chain is tensioned, may have any convenient form, for example they may be plane, half round, or bevelled as shown at 26 and 27 (Figure 6) so as to form a knife edge.

In the arrangement shown in Figure 7, the edges of the plates may be splayed as at 28, 28a, so as to form a sliding surface.

When it is necessary to join the shoulder pieces to the bands by welding, this operation should be done at points at a suitable distance from regions where the band will bend or be under tension, so that the change in state of the metal due to welding heat may not affect these regions.

According to my invention, the tubes connecting the bands of different links may carry at their ends carriers, baskets, cups, or the like (not shown in the drawing) for supporting articles, which it is desired to transport. Equally well the tubes may carry at their ends members engaging supports for merchandise or other heavy objects, which may slide over appropriate guides.

The tubes 12 also form the members which are engaged so as to move the chain. In order to effect this, wheels or motor pulleys 35 are provided on their cylindrical surfaces 36, with transverse channels or cells 37, semi-cylindrical in form and the length of a link apart, the channels being adapted to receive the tubes as shown in Figure 1. This arrangement thus enables objects to be transported in either direction.

The elasticity of a chain constructed according to my invention enables it to be twisted, without danger, whilst passing from one pulley to another, which may be necessary for a change in direction.

The invention may also be applied to cases in which the elastic longitudinal element of the chain comprises a single or several bands arranged in the same or in parallel planes.

What I claim is:

1. In an endless chain, a flexible displaceable link comprising a flexible longitudinal element, a transverse tubular body element, longitudinal diametrically opposite slots in said tubular body for engaging the ends of the flexible longitudinal elements of two adjacent links, shoulder pieces adapted to the ends of said flexible elements for locating and holding said ends within said tubular body, and means for preventing longitudinal displacement of said flexible elements in said slots.

2. In an endless chain, a flexible displaceable link, according to claim 1, in which the longitudinal flexible elements are formed of several parallel steel bands arranged in the same plane, the shoulder pieces provided at the ends of said flexible elements being formed by plates rigidly attached to each side of each flexible element and forming with the latter a T shaped member.

3. In a flexible displaceable link for an endless chain, a transverse tubular body element provided with longitudinal diametrically opposite slots for engaging the ends of parallel steel bands, forming the longitudinal flexible elements of two adjacent links, shoulders forming with the flexible element a T-shape on the ends of each steel band for locating and holding said ends in said tubular body, means to prevent said steel bands from any longitudinal displacement relative to the tube and means to permit a small angular displacement of the said flexible steel bands in the said diametrically opposite slots, about the axis of the tube.

4. A flexible displaceable link for an endless chain according to claim 3, in which the flexible steel bands are prevented from any longitudinal displacement relative to the tube by means of cylinders interposed between adjacent shoulders and stoppers fitted into the ends of the tube and removably fixed to the latter.

5. A flexible displaceable link for an endless chain according to claim 3, in which the flexible steel bands are prevented from any longitudinal displacement relative to the tube by means of sleeves interposed between adjacent bands and by two other sleeves fitted into the ends of the tube and removably fixed to the latter.

6. A flexible displaceable link for an endless chain according to claim 3, in which the face of the shoulder piece, in contact with the tube, is bevelled towards the plane of the band.

7. A flexible displaceable link for an endless chain, according to claim 3, in which the face of the shoulder piece, in contact with the tube presents a rounded surface able to slide over the surface of said tube.

MAURICE COLLETTE.